July 18, 1967  G. W. JACKSON  3,331,616
VEHICLE LEVELING SYSTEM

Filed Nov. 30, 1964  3 Sheets-Sheet 1

INVENTOR.
George W. Jackson
BY J.C. Evans
His Attorney

INVENTOR.
George W. Jackson
BY J.C. Evans
His Attorney

United States Patent Office 3,331,616
Patented July 18, 1967

3,331,616
VEHICLE LEVELING SYSTEM
George W. Jackson, Dayton, Ohio, assignor to General Motors Corporation, Detroit, Mich., a corporation of Delaware
Filed Nov. 30, 1964, Ser. No. 414,663
1 Claim. (Cl. 280—124)

This invention relates to systems for automatically maintaining a predetermined height relationship between a sprung and an unsprung mass and, more particularly, to such systems that include a combination shock absorber and a pressurizable air booster spring.

One problem in many spring suspension systems that support the body of a motor vehicle with respect to its axle and ground engaging wheels is that as the load distribution in the body changes the height relationship between the body and axle and road engaging wheel structure moves from a preselected desired height relationship.

An object of the present invention, therefore, is to automaticaly maintain a desired height relationship between a sprung body and unsprung frame and axle wheel assembly of a vehicle by means of a system including a combination shock absorber and air sprung unit selectively pressurizable by a thermal compressor system that includes a first body of fluid selectively heated to a predetermined temperature and pressure and means for using the energy of the first fluid for compressing a second body of fluid to pressurize the air sprung unit.

A further object of the present invention is to improve a system for automatically maintaining a desired height relationship between a sprung vehicle body and an unsprung axle and road engaging wheel assembly by selectively pressurizing an air spring unit that has a shock absorber in combination therewith by raising the pressure of a first body of fluid in a thermal compressor system by means including a driver pumping element acted on by a second body of fluid selectively heated to a predetermined temperature and pressure.

Further objects and advantages of the present invention will be apparent from the following description, reference being had to the accompanying drawings wherein preferred embodiments of the present invention are clearly shown.

Figure 1:
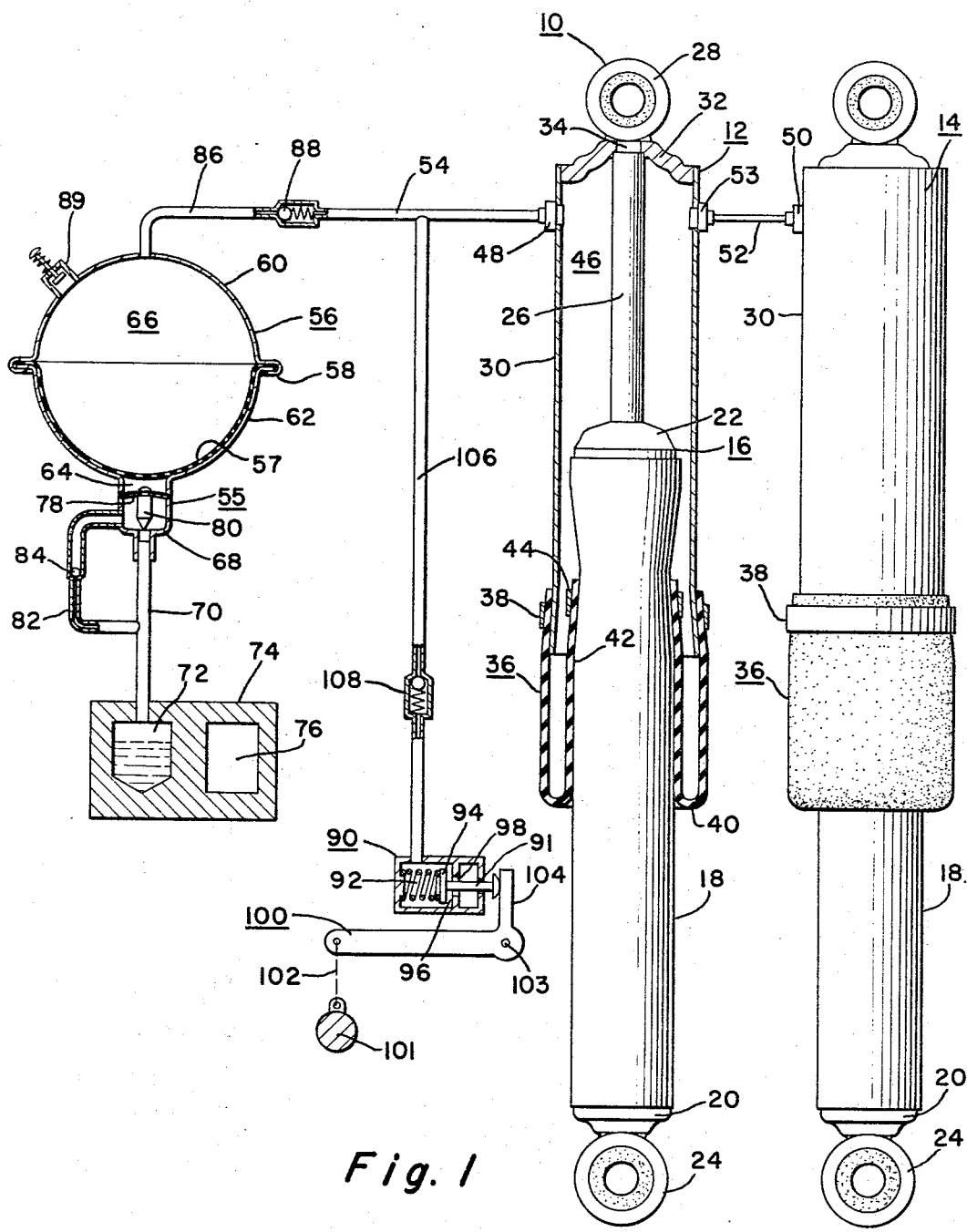
FIGURE 1 is a diagrammatic view of an automatic leveling system including the present invention.

Referring now to the drawings, in FIGURE 1, an improved automatic leveling system 10 is illustrated including a pair of combination shock absorber and air spring units 12, 14. Each of these combination units are of the type representatively and more particularly set forth in United States Patent No. 3,063,701, issued Nov. 13, 1962 to Long, for Shock Absorber With Air Booster Spring. As more fully explained in the Long patent, such units are adapted to be connected between sprung and unsprung masses, for example, the sprung mass being the body of a motor vehicle and the unsprung mass being its axle and wheel assembly. Such units are operable to produce a continuous damping of high frequency movements between the spring and the unsprung masses that are produced by normal vehicle travel.

Additionally, the air spring portion of such units is selectively pressurizable to supplement the primary load carrying springs included in a primary vehicular suspension system to compensate for changes in the weight of the sprung mass to maintain a desired height relationship between the sprung and unspring masses. In the case of the automobiles, the sprung mass represented by the vehicle body preferably is maintained at a design height wherein the headlights thereon are properly aimed along a roadway and the fuel tank, muffling system and the like are sufficiently elevated to prevent their scraping steep inclines. Furthermore, by maintaining the body at such a design height, it will not bottom out against frame stops.

In accordance with certain principles of the present invention, the automatic leveling system 10 automatically maintains such a desired design height relationship when the vehicle is both loaded and unloaded.

Each of the representatively illustrated combination units 12, 14 includes a shock absorber unit 16 having a cylindrical outer surface 18 with a lower open end closed by a closure member 20 and an upper open end closed by a closure member 22. On the end member 20 is secured a bearing mount 24 adapted to be connected to the axle of the unsprung mass of a motor vehicle. At the opposite end of the shock absorber a reciprocal piston rod 26 is directed through the upper end closure member 22 exteriorly thereof where it is connected to an upper bearing mount 28 adapted to be secured to the sprung mass.

Carried on the reciprocal piston rod 26 is a tubular, rigid, elongated member 30 concentrically arranged with respect to the outer shock absorber surface 18 in spaced, surounding telescoping relationship therewith. The member 30 has an upper head 32 that is fixed to the reciprocal piston rod 26 immediately below the upper bearing mount 28 by fitting in a reduced diameter part 34 on the rod 26. The opposite open end of the member 30 is closed by a flexible sleeve 36 of resilient material having one end thereof surrounding the opened lower end of the member 30 in continuous engagement with the outer surface thereof where it is fastened by a clamp ring 38 in tight sealing engagement therewith.

The sleeve 36 is rolled into itself to form a reverse bend portion 40 for connecting the outwardly located end 37, to an inwardly located portion 42 of the sleeve 36. The portion 42 is of a varying length dependent upon the relative distance between bearing mounts 24, 28 and is supportingly received by the outer cylindrical shock absorber surface 18 throughout substantially its full extent as best illustrated in FIGURE 1 where the unit is shown in its design height position. At the upper end of the portion 42 a clamp ring 44 holds the portion 42 in supported sealing engagement wtih the outer surface 16.

The tubular member 30, shock absorber unit 16 and flexible sleeve 36 thereby cooperate to define a pressurizable chamber 46 that has a fluid fitting 48 thereto located in supported relationship on the tubular member 30 of unit 12 and a like fitting 50 similarly arranged to serve as a fluid fitting for the chamber 46 in unit 14.

The fluid fitting 50 communicates with a conduit or balance line 52 that is connected to a fitting 53 on unit 12 and fitting 48 connects to a line 54 of a thermal compressor system 55 that selectively directs a predetermined quantity of a suitable pressurizable fluid such as air into the air spring units for maintaining the desired predetermined height relationship.

The system 55, more particularly, is illustrated as including a spherical pressure vessel 56 having a flexible diaphragm 57 directed thereacross with a peripheral edge 58 thereon held in sealing engagement between a first half 60 and a second half 62 of the vessel 56 to form a first fluid chamber 64 on one side of diaphragm 57 and a second fluid chamber 66 on the opposite side thereof. The fluid chamber 64 in the illustrated embodiment fluidly communicates with a sump forming enclosure 68 having a tube 70 connected thereto for communicating the interior of enclosure 68 with a boiler cavity 72 formed within an exhaust manifold casting 74 of the vehicle including a space 76 through which the hot exhaust gases are directed. Accordingly, a predetermined amount of water in the boiler space 72 has the temperature thereof raised by the hot gas flow through the exhaust manifold 76 until it is converted to steam.

During vehicle operation the boiler space 72 is continually heated so that a pressurized amount of water or the fluid can be vaporized to power diaphragm 57. A bimetallic element 78 in the enclosure 68 is formed to hold a valving element 80 to control steam flow through tube 70 into enclosure 68. At a predetermined operating temperature, for example 190–250° F., the bimetallic element 78 holds the valving element 80 in an open position.

Steam then fills the chamber 64 to move the diaphragm 57 into pumping chamber 66 for forcing air under pressure through an outlet line 86 therefrom having a one-way exhaust valve 88 therein for selectively directing the pressurized air into the air spring units through fittings 48, 50 thereon.

As the temperature of the steam increases, the bimetallic element 78 responds at a predetermined maximum temperature as, for example, 330° to 340° F. to move valving element 80 to a closed position. The pressure chamber 64 is cut-off from the exhaust manifold 74 and the steam condenses back into the enclosure 68 to draw a vacuum in chamber 64 which causes diaphragm 57 to move so as to draw air through an intake valve assembly 89 interiorly of the pumping chamber 66 in the vessel 55. During cut-off a safety bypass line 82 with a one-way ball check 84 therein prevents overpressurization of tube 70. Following a predetermined cooling period, the temperature of the bimetallic element 78 decreases to 190–250° F. whereby it snaps in a reverse position to open communication between the enclosure 68 and tube 70. This causes the condensed water to drain through the tube 70 back into the boiler 72 where it again is flashed to steam and directed upwardly through the tube 70 and enclosure 68 into the chamber 64 for a repeat thermal compression operation.

In the embodiment illustrated in FIGURE 1 a predetermined height relationship is maintained by means of a height control exhaust valve assembly 90 including a valve stem 91 biased by means of a spring 92 into a position where a valving element 94 secured on one end of the stem 91 sealingly engages a valve seat 96 around an exhaust opening 98. When the units 12, 14 are overpressurized, the body will move upwardly with respect to the axle of the vehicle so as to cause a control member 100 pivotally secured at 103 to the body and to an axle 101 by a link 102 to pivot about the point 103 so that a stem engaging portion 104 thereon will move to cause the stem 91 to be moved against the biasing action of spring 92 to cause the valve 90 to open whereby pressurized fluid in the units 12, 14 is discharged through the line 54 and an exhaust line 106 that includes a minimum pressure check valve 108 to atmosphere. The valve 108 maintains a minimum pressure in the units 12, 14 when they are not in use so as to prevent undesirable collapse of the sleeve 36 during these periods.

Figure 2:
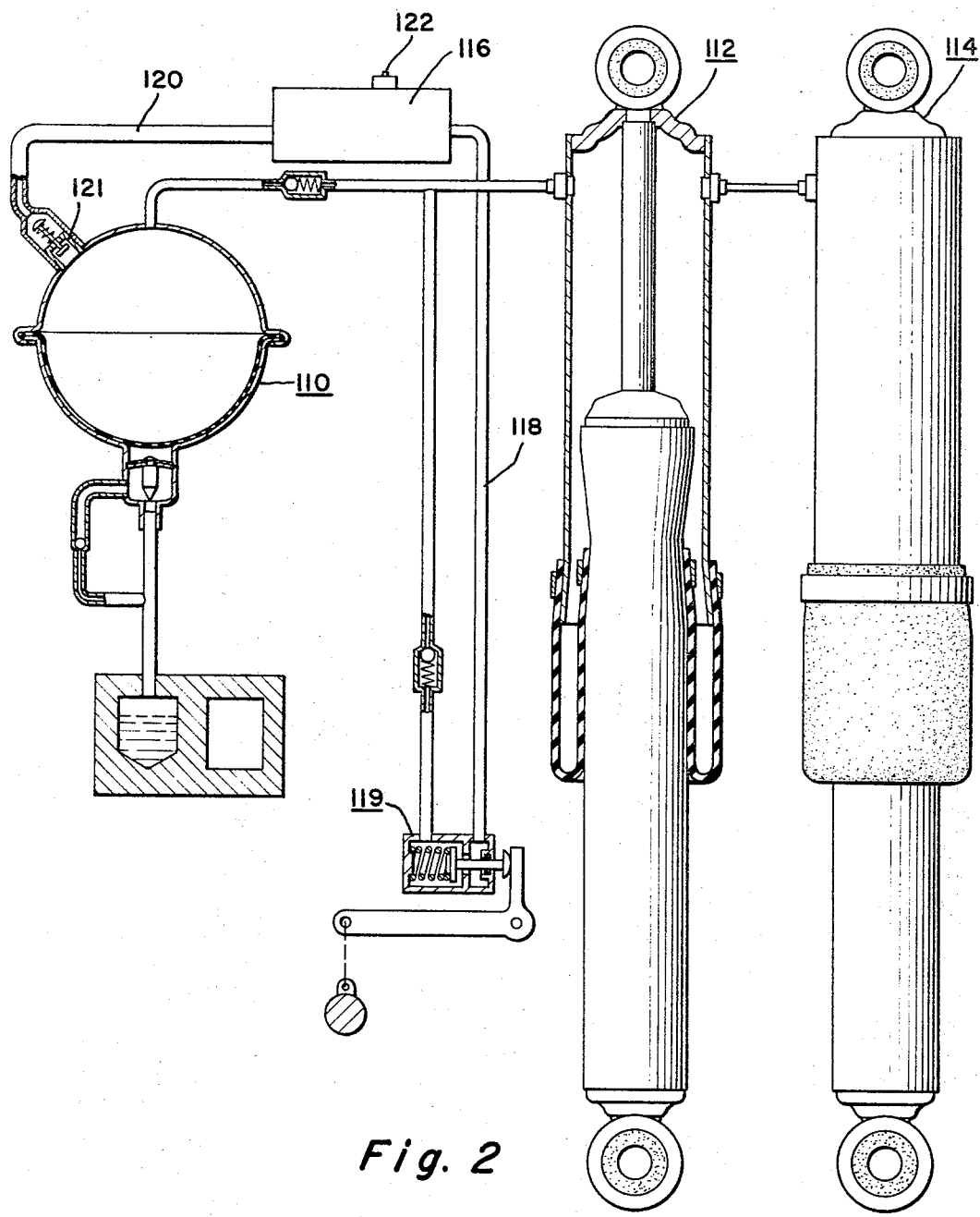
FIGURE 2 is a diagrammatic view of a modification of the system illustrated in FIGURE 1.

In the embodiment shown in FIGURE 2 a thermal compressor system 110 like the system 10 in the embodiment of FIGURE 1 is shown associated with combination shock absorber and air spring units 112, 114 like units 12, 14 in the embodiment of FIGURE 1. In this arrangement an intake reservoir 116 is associated with the thermal compressor system 110 to complete a closed pressure system between the pumping chamber of the thermal compressor 110 and the units 112, 114. More particularly, the reservoir 116 has an inlet line 118 thereto that communicates with the outlet of an exhaust control valve assembly 119 in the system 110 like valve 90. An outlet line 120 from the reservoir 116 is in communication with an inlet valve 121 to the pumping chamber of the system 110 like valve assembly 89 of the system 10. A fluid charging fitting 122 is located on the vessel 116 for maintaining a predetermined amount of pressurizable fluid therein as required to fill the operating requirements of the system.

Figure 3:
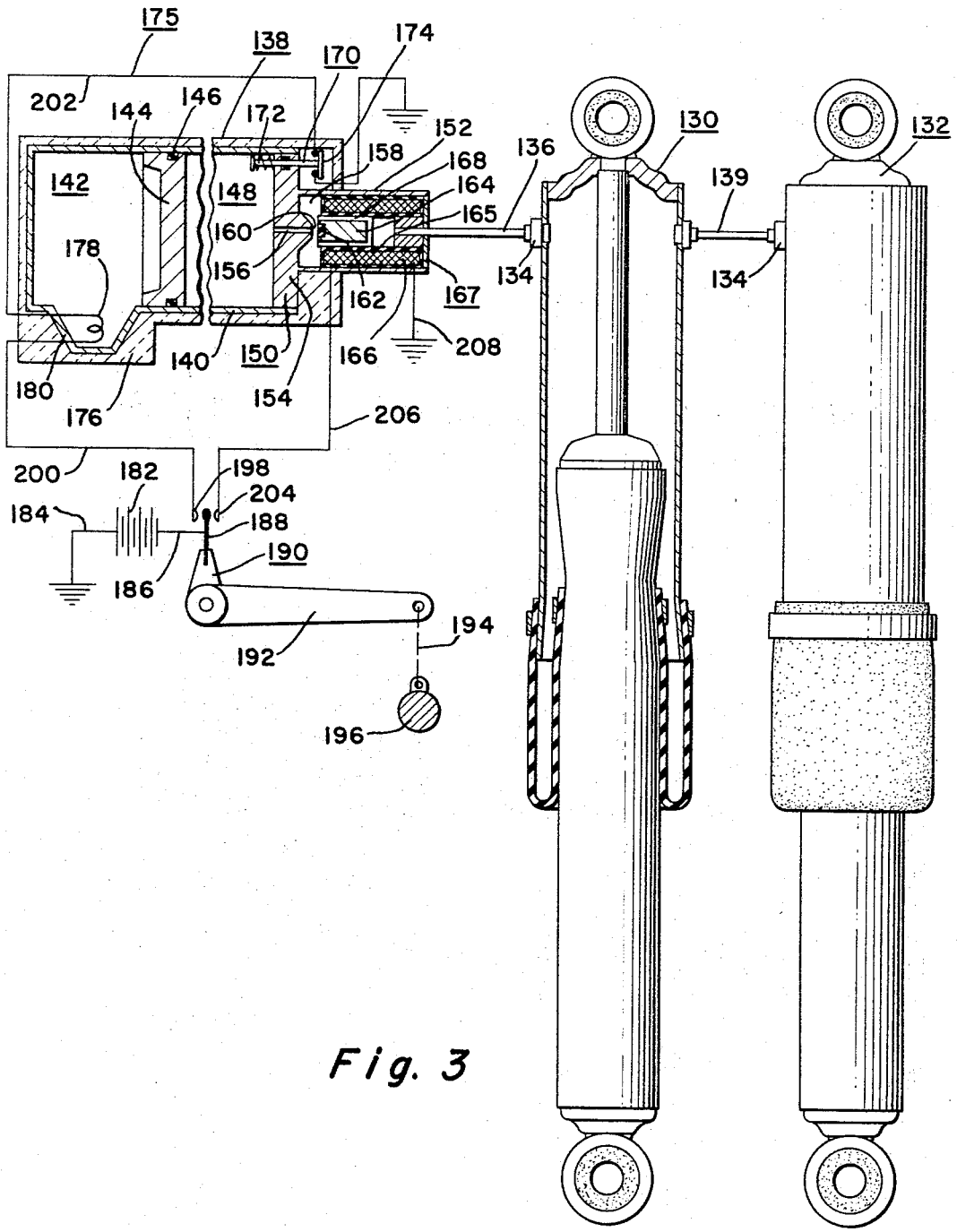
FIGURE 3 is a diagrammatic view of a still further modification of the present invention.

In FIGURE 3 another embodiment of the invention is illustrated including a pair of combination shock absorber and air spring units 130, 132 like units 12, 14 in the first embodiment. Each of the units has an inlet fitting 134 that on unit 130 connects to a line 136 associated with a thermal compressor unit 138 and on unit 132 connects to a balance line 139 to unit 130. In this embodiment the thermal compressor unit 138 includes an elongated cylinder 140 having a pressure chamber 142 therein formed on one side of a movable piston 144 slidably supported within the cylinder 140 so that an annular seal 146 in the outer periphery thereof sealingly engages the inner surface of cylinder 140 to separate chamber 142 from a pumping chamber 148 formed on the opposite side of the piston 144.

The cylinder 140 has an open end thereof closed by an end closure member 150 including an outwardly projecting tubular end 152 and a head 154 that is supportingly received by the cylinder 140.

An opening 156 is formed through the head 154 to communicate the pumping chamber 148 with an interior space 158 of the tubular end 152. The passage 156 is surrounded at one end thereof by a raised valve seat 160 that is adapted to be engaged by a valving element 162 carried by a reciprocal armature element 164 that is slidably received within an opening 165 through an electrically energizable coil 166 of a solenoid valve assembly 167. The movable armature element 164 has a relief 168 formed therein whereby fluid from chamber 148 can pass through opening 165 into line 136.

The head 154 also supports a safety switch assembly 170 having a stem 172 selectively engaged by the pumping face of the piston 144 to move a contact 174 into an open position to open a thermal heating circuit 175.

In the illustrated arrangement the volume of the cylinder 140 is approximately four times that of the fluid spring volume in the combination units 130, 132. The cylinder 140 is thermally insulated by a layer of good insulating material 176 in surrounding relationship thereto so that a selective heating and cooling of the fluid within the cylinder 140 will effect a predetermined compressing action. In the illustrated arrangement within the pressure chamber 142 is located a first predetermined pressurizable fluid, for example, one having relatively large molecules having several motional degrees of freedom such as Freon 11. Such a gas has desirable expansion and condensation characteristics whereby when it is heated to a predetermined temperature it will drive the piston 144 so as to compress a suitable compressible fluid in the pumping chamber 148, for example, air. The fluid compressed in the pumping chamber 148 is selectively controlled by the solenoid valve assembly 167 to be discharged into the air spring part of the combination units 130, 132.

In the illustrated arrangement, the source of heat for the first pressurizable fluid in the chamber 142 is supplied by an electrical resistance heater 178 located within a sump 180 in the vessel 140 that serves as a boiler for a condensible gas such as Freon 11. The heater is selectively energizable by a source of power 182, for example, the battery in an automobile that has one terminal 184 connected to ground and another terminal 186 thereof connected to a movable contact carrying arm 188 of a delayed action, double-pole, single-throw switch assembly 190 supported on a pivotal arm 192 that connects to a link 194 between the arm 192 and an axle housing 196.

The arm 192 is pivoted on the body of the vehicle for detecting changes in the distance between the body and the axle 196 and will, upon movement of the body below the desired height relationship, cause the contact carrying arm 188 to move into engagement with a fixed contact 198 of the switch 190 to close a heater circuit from the terminal 186 of battery 182 through closed contacts 188, 198, a conductor 200, through the heater 178, a conductor 202, the closed safety switch 174 to ground. The closed heating circuit 175 effects a predetermined temperature increase of the fluid in chamber 142 causing it to be vaporized and thereby effect a predetermined pressure increase in the pressure chamber 142 for actuating the pumping piston 144. During this time, the solenoid valve 167 is de-energized and compressed air in chamber 148 is discharged through passageway 156 into the opening 158 and thence through relief 168 into the supply tube 136 for the superlift units. The armature 164 acts as a one-way check when the valve 167 is de-energized allowing flow from chamber 148 into units 130, 132 while limiting reverse flow. Once the units are returned to a desired height relationship, the control arm 192 positions the contact carrying arm 188 out of engagement with contact 198 to de-energize the heater circuit.

In cases where the body moves upwardly from its desired height relationship, as for example, when the vehicle is unloaded and the superlifts are pressurized, the control arm 192 is moved to position the contact carrying arm 188 into engagement with a fixed contact 204 of the switch 190 so as to complete a solenoid energization circuit from the battery terminal 186 through closed contacts 188, 204, a conductor 206, the coil 166, and a conductor 208 to ground. The armature 164 is thereby pulled interiorly of the coil 166 to move valving element 162 from seat 160 to allow exhaust of fluid from units 130, 132 into chamber 148.

By virtue of the above illustrated embodiments of the present invention, a positive supply of pressurized air is quickly available for use in a combination shock absorber and air spring unit to effect a reliable positive automatic leveling action between the sprung and the unsprung masses of a vehicle associated with the combination units.

While the embodiments of the present invention as herein disclosed constitute preferred forms, it is to be understood that other forms might be adopted.

What is claimed is as follows:

In an automatic leveling system for association with a sprung and an unsprung mass supported by a main suspension system, the combination of, a shock absorber unit having the opposite ends thereof adapted to be connected to the sprung and unsprung masses respectively, an inflatable fluid spring means supported by said shock absorber operative to produce a predetermined relative movement between the ends of the shock absorber to maintain a desired height relationship between the sprung and unsprung masses, enclosure means forming a first chamber having a first fluid therein, means for directing said first fluid into said inflatable fluid spring means, said enclosure means including a second chamber having a second fluid therein, means for heating said second fluid to increase the pressure thereof to a predetermined point, means including a movable member defining a wall between said first and second chambers for separating said chambers and responsive to the increase in pressure of said second fluid to effect a pressurization of said first fluid to inflate said fluid spring means, means for selectively exhausting a predetermined amount of the pressurized first fluid from said fluid spring means in response to a first predetermined height relationship between the sprung and unsprung masses, an engine having an exhaust manifold, means forming a fluid reservoir in heat transfer relationship with said exhaust manifold, a tube communicating said fluid reservoir with said second chamber, snap acting valve means in said tube for controlling communication between said second chamber and said fluid reservoir, said snap acting valve means opening communication between said reservoir and said second chamber when fluid in said reservoir reaches a first predetermined temperature, said valve means closing communication between said reservoir and said second chamber to cause cooling of said second fluid following its compressing action

References Cited
UNITED STATES PATENTS

| | | | |
|---|---|---|---|
| 2,949,315 | 8/1960 | Taylor | 280—124 |
| 3,042,393 | 7/1962 | Schmitz et al. | 267—64 X |
| 3,120,962 | 2/1964 | Long | 267—64 X |
| 3,145,985 | 8/1964 | Carbon | 267—64 |
| 3,173,671 | 3/1965 | Broadwell | 280—124 X |

A. HARRY LEVY, *Primary Examiner.*

UNITED STATES PATENT OFFICE
CERTIFICATE OF CORRECTION

Patent No. 3,331,616            July 18, 1967

George W. Jackson

It is hereby certified that error appears in the above numbered patent requiring correction and that the said Letters Patent should read as corrected below.

Column 1, lines 25 and 30, for "sprung", each occurrence, read -- spring --; line 59, for "Long," read -- Long, Jr., --; line 66, for "spring" read -- sprung --; column 2, line 1, for "unspring" read -- unsprung --; column 6, line 39, for "3,042,393" read -- 3,042,392 --; line 40, for "Long" read -- Long, Jr. --.

Signed and sealed this 18th day of June 1968.

(SEAL)
Attest:

Edward M. Fletcher, Jr.            EDWARD J. BRENNER

Attesting Officer            Commissioner of Patents